Nov. 19, 1968 R. G. STEPHENS 3,412,379

SIGNAL COMBINING COMPARATOR

Filed Jan. 6, 1964 2 Sheets-Sheet 1

Nov. 19, 1968 R. G. STEPHENS 3,412,379

SIGNAL COMBINING COMPARATOR

Filed Jan. 6, 1964 2 Sheets-Sheet 2

3,412,379
SIGNAL COMBINING COMPARATOR

Richard G. Stephens, Binghamton, N.Y., assignor to Character Recognition Corporation, Binghamton, N.Y., a corporation of Delaware Filed Jan. 6, 1964, Ser. No. 335,875
15 Claims. (Cl. 340—146.3)

This invention relates to character recognition devices, and more particularly to improved character identifying apparatuses of simplified and economical types.

Template or mask-type character recognition devices generally have been regarded with disfavor by the prior art because they have been extremely intolerant of registration deviations and angular skew. If they can be made more tolerant of irregularities in registration and skew, they offer the potential advantage in general of requiring much less electronics logic and many fewer parts than the flying spot scanner-digital logic type of recognition machine. One feature of the present invention is a form of "mask" matching in which each character to be recognized is represented by an aperture in the mask which is somewhat larger than the character it represents, so that even when a matching character being read is centered perfectly in the aperture of the mask, a known amount of light will pass through the system and provide a signal from a photosensor such as a photocell. It will be appreciated that as long as the character remains within the area defined by the enlarged aperture of the mask. the amount of unmasked light which passes through to the photosensor will be entirely unaffected by the precise position of the character within the aperture, and hence that the signal produced will be the same regardless of vertical and horizontal registration of the character and regardless of angular skew of the character.

One illustrated form of the invention includes a rotatable circular character mask in which the characters to be recognized are represented by apertures placed successively around the periphery of the mask, so that an unknown character on a document is scanned successively, i.e. serially, by successive enlarged apertures representing different characters of the machine vocabulary. The invention is not limited to a serial recognition process, however, and known techniques may be utilized to present the unknown character image simultaneously to a plurality of mask apertures.

Another very important feature of the invention, which feature may be used either with enlarged mask scanning or with various known types of scanning including magnetic ink scanning, is the use of plural functions of a single scanning-derived signal in order to derive information relating to an unknown character being scanned. In many character-sensing devices of the prior art, characters are scanned with one or more scanning devices in one or more passes to provide electrical signals which are then applied to pulse train or waveform recognizing circuits. In general, most machinery of the prior art has utilized scanning which provides one lever of signals when a black or magnetized portion of a character is being sensed and which provides a second level of signal when white background or an unmagnetized area is being sensed, and the waveforms or pulse trains comprising such scanning-derived signals are then applied (typically) to delay lines or shift registers. It also is common to use a plurality of independently operating sensing devices (such as a row of photosensors or a row of magnetic heads) to provide a plurality of independent scanning-derived signals each related to a different portion of the character area scanned. In accordance with the present invention, however, I prefer to convert the signal derived from a single sensor into a plurality of signals having a predetermined functional relationship, and to apply the plurality of signals to the recognition logic, so that characters are identified in accordance with the plural characteristics of the plurality of signals derived. In one of the simple and merely illustrative embodiments shown below, as one example, the original signal derived from scanning a character with a single scanning device, is integrated with respect to time to provide a second signal, and the recognition logic is arranged to be responsive both to the original signal and the integrated signal. As well as integrating the original signal, it is within the scope of the invention to differentiate the signal, and to provide recognition logic which is responsive to any pair or all three of the signals.

It will become apparent as the description proceeds that the above-mentioned integration and differentiation need not comprise pure integration or differentiation, but in some embodiments of the invention may readily use other time functions, such as "lags" and "leads," having transfer functions such as $$\frac{1}{p+k}$$

and $(p+k)$, for example, wherein $p$ is the differential operator and $k$ is a constant. It also will become apparent that in some embodiments of the invention the secondary signals which are produced as a known function or functions of the original scanning-derived signal need not be simple *time* functions thereof, but instead may vary as functions of other independent variables.

In one illustrative example of the invention, the recognition logic of the invention is operated in accordance with the *sum* of third and fourth signals which result from separately comparing the original signal and the function signal with stored information relating to characters. In another embodiment of the invention recgonition is based on the *product* of such third and fourth signals. It is within the scope of the invention, however, to base recognition on a number of further relationships, however, such as ratios and various arbitrary functions of the signals which result from comparing the signals applied to the recognition logic with character information stored in the recognition logic circuitry. As a simple example, assume that an original scanning-derived signal, a second input signal corresponding to its time-derivative, and a third signal corresponding to its time integral all are applied to recognition logic circuits, to provide a first output signal commensurate with a function of the degree of match between a characteristic of the original scanning-derived signal and a first value stored in the logic, and a second output signal commensurate with a function of the degree of match between a characteristic of the second input (time-derivative) signal and a second value stored in the logic, and a third output signal commensurate with a function of the degree of match between a characteristic of the third input (time integral) signal and a third value stored in the logic. The acceptance of the unknown character as corresponding to a stored character, or the rejection of the unknown character as not corresponding to any stored character, may be done, in different embodiments of the invention, in a variety of different ways, such as by comparing the sum of functions of the first and second output signals times the value of a function of the third output signal with a desired threshhold, or by comparing the product of functions of all three signals with a desired threshold, etc. Which of the arrangements is most advantageous for a given application will be seen to depend upon a variety of factors including the nature of the data to be scanned, the number of characters to be included in the machine vocabulary and the closeness of the similarities between similarly formed characters, and thus it is impossible to generalize as to the operational characteristics of the many possible embodiments which will become immediately apparent to those skilled in the art upon a perusal of this disclosure.

Thus it is a primary object of the present invention to provide improved and economical character recognition apparatus.

It is an allied object of the invention to provide character identification apparatus which is tolerant within limits to deviations in character registration and angular skew.

It is another primary object of the invention to provide improved character recognition apparatus in which a scanning-derived signal from a single scanning means is converted to a plurality of predetermined function signals which are individually processed by recognition logic circuits to provide a plurality of output signals representative of different match criteria, and improved apparatus for processing such output signals to operate character-identifying indicators.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which.

Figure 1:
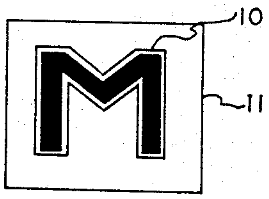
FIG. 1 illustrates a pattern mask, according to one embodiment of the invention, in proper registration with a character to be recognized.
Figure 2:
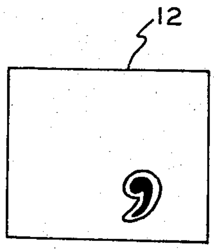
FIG. 2 illustrates another pattern mask, according to one embodiment of the invention.

Referring now to FIG. 1, there is shown a portion of a mask 11 having a transparent aperture of outline 10. Mask 11 may comprise a known type of scanning mask, such as the type shown in Pat. No. 2,933,246, for example, except that the character apertures are enlarged, as will be described. It should be understood that the outline 10 of the aperture for the letter M in mask 11 in FIG. 1, is spaced outwardly both vertically and horizontally from the letter M shown in black, which may be deemed to represent the actual letter "M" as it is expected to appear on the documents to be read, during the actual operation of the device. Though not shown in FIG. 1, light from a source is directed to the document to be read through mask 11, and light reflected from the document is optically directed to strike a photosensor to provide an electrical signal. Because the M aperture in mask 11 is substantially larger than the letter "M" to be read, even when the letter M is centered perfectly in the aperture, a known amount of light will pass through the system and provide a photocell output signal. All other apertures in the mask are similarly larger than their associated characters, although the amount of unmasked light which reaches the photocell during perfect registration will vary with different characters, generally in accordance with their size. For example, it will be seen that less light will pass through the unmasked portion of a comma mask 12 shown in FIG. 2, since the M is much larger than the comma. It is not necessary that the edges of the apertures all be exactly the same distance from the edges of perfectly registered characters, and as will be explained below, some masks may depart greatly from such an arrangement.

Assuming relative horizontal movement between an aperture 10, having the geometrical outline of the alphabetical character M on mask 11, and the black character on the document being read, it will be seen that due to the enlarged size of the aperture in mask 11, the unmasked light passing through the system to the photocell will *remain constant* for a period of time which depends upon how much larger the aperture is than the black character being read. If one assumes constant speed of relative horizontal displacement between the mask and the character, it will be seen that the length of time during which the photocell output will remain constant will be the same irrespective of horizontal character registration, and, to a limited extent, irrespective of vertical registration and angular skew. The more one makes the aperture exceed nominal character size, the more tolerant the machine will be of poor registration and skew, but the larger the constant output signal will be during the time when the black character crosses its associated aperture. One feature of the invention is sensing that unmasked light remains the same for a given period of time as the matching character passes across its corresponding mask, but that the amount of unmasked light is usually changing as unmatching characters are passed across a given aperture. By time integrating a signal for the length of time the unmasked light remains constant as a black character is compared with different masks (either simultaneously or sequentially), one can obtain outputs which are partial measures of the degree of match of the black character and each of the characters carried on the masks.

It is quite possible to fashion characters (and masks) where the rate of change of unmasked light would remain zero for a substantial time even though a character was very dissimilar to a mask, since, for example, black on one side of the character might be entering the mask aperture at the same rate that black on the other side of the character is leaving the aperture, and the rate of change would remain the same when entirely black, or entirely white, spaces are compared with a mask. If the device is intended to handle characters in which this may occur, further features may readily be added to resolve such ambiguities, as will be better understood as the description proceeds. Since the amount of unmasked light which should pass to the photocell for a matching character is known and can be predetermined, a character is regarded as identified only if its unmasked light rate of change has been substantially zero for a given time, *and* if the absolute value of its unmasked light has been within a predetermined tolerance at a given time during an attempted match, *and,* if desired, only if the time integral of its unmasked light also falls within predetermined tolerances. Because the photosensor signal may be differentiated and integrated with very few components, and because the additional components need be furnished only once and not for each character in the vocabulary, the proportional value of the signal measured by the excursion from its original level for unmasked light, the time derivative of the signal (or more correctly, the time that the time derivative remains zero), and the time integral of the signal all may be provided very easily and economically.

Figure 4:
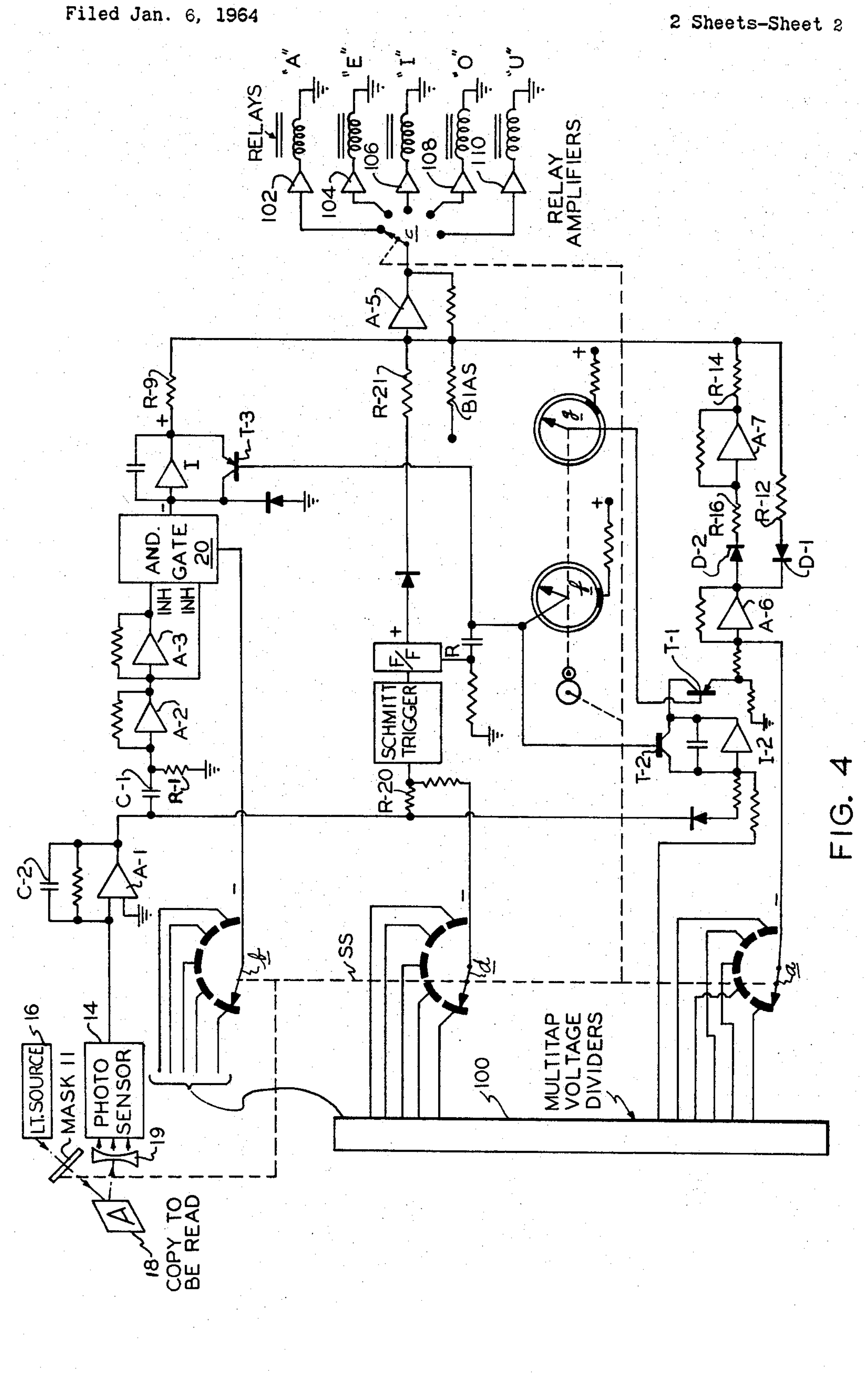
FIG. 4 is a schematic diagram, partly in block form, of a preferred embodiment of the invention.

In an elementary illustrative serial system, such as that shown in FIG. 4, the output of a photosensor 14, which is responsive to the light from a source 16 directed through the mask 11 and reflected by the copy to be read indicated at 18, and focused by an optical lens 19, is amplified by amplifier A–1 and time differentiated by C–1, R–1. Before being differentiated, the photosensor signal has some of its "hash" or high frequency noise filtered out by a small capacitor C–2 connected across amplifier A–1. If the magnitude of the unmasked light reaching photosensor 14 is constant, amplifiers A–2 and A–3, coupled to differentiator C–1, R–1, yield zero output. However, when the magnitude of the unmasked light is changing, either increasing or decreasing, one or the other of amplifiers A–2, A–3 supplies an inhibiting signal to an AND gate 20. If no inhibiting signal is applied to AND gate 20, a signal from selector arm *b* of a first pole of a multi-pole sampling switch SS is applied to an integrator I, to provide an output signal that increases in accordance with the time the unmasked light is not changing. Arm *b* of sampling switch SS is driven by the same motive means which rotates mask 11, and arm *b* engages a different contact as each different aperture on mask 11, of a plurality of individual masks, passes across the character being identified. Each contact engaged by arm *b* is connected to a tap on a multi-tap voltage divider 100, so that the magnitude of the voltage connector to integrator I by AND gate 20, during any period of constant unmasked light, depends upon which character aperture of mask 11 is being swept past the unknown character being read. If the integrator I output voltage reaches a high enough level during the scanning of a given character, its output will operate an output relay (through amplifier A–5 and arm *c* of the sampling switch) to identify the character, assuming that other circuits to be described now also accept the character as substantially matching within desired tolerances.

The output of amplifier A–1 is integrated for a predetermined length of time as a mask is swept across a character by integrator I–2, thereby providing at the end of each comparison an output signal commensurate with the time integration of unmasked light. Assuming a given mask-character relative translation or rotation velocity, the signal or voltage level which each character should provide at the output circuit of integrator I–2 when it matches its mask can be predetermined, and such voltages for each character (but of opposite polarity) are applied by arm *a* of the sampling switch SS (*after* a character is scanned past) to the input circuit of amplifier A–6. The output voltage from integrator I–2 is connected through emitter follower transistor T–1 and a scaling resistor to amplifier A–6. Thus after a matching character is scanned, the summed output from A–6 is substantially zero, while unmatching characters will result in either positive or negative voltages at the output circuit of amplifier A–6. If the unbalance is negative, a voltage will be applied to amplifier A–5 through diode D–1 and scaling resistor R–12 to decrease amplifier A–5 output, while a positive unbalance will be inverted by amplifier A–7 and applied via scaling resistor R–14 to decrease amplifier A–5 output.

The output from amplifier A–1 is also applied via scaling resistor R–20 to a level-sensing device such as flip-flop F/F (which may be preceded by a Schmitt trigger) which also receives an input from arm *d* of the sampling switch. If the unmasked light flux received by the sensor falls below a predetermined value for a given character at any time during the scanning of the character, the switching of flip-flop F/F applies a positive voltage via resistor R–21 to increase the amplifier A–5 output, thereby indicating "greater match." Thus the rate of change, the time integral, and the minimum value proportional to the original unmasked light signal all are analyzed to determine the degree of match. While a single one of these parameters may be identical (or nearly identical) for two or more characters of a given font, fewer pairs of characters of an ordinary font will have *two* nearly identical parameters, and it is even less likely that any pair of characters of an ordinary font will have all three parameters nearly identical, and hence the analysis of plural functions of the original signal helps to provide good discriminability between characters. To enhance the discriminability of the device, one may alter the masks in various ways so that they actually differ in shape from their associated characters but thereby accentuate one of the three parameters in order to more easily distinguish them from rather similarly-formed but unmatching characters. It will be seen that, so long as an unknown character all falls somewhere within the enlarged aperture of its associated mask, registration (vertically and horizontally), and skew have absolutely no effect on the output signals from the proportional and time integral channels, and only on the differentiating channel, and that a considerable amount of skew may be tolerated by suitable design of the enlarged aperture in the mask.

Figure 6:
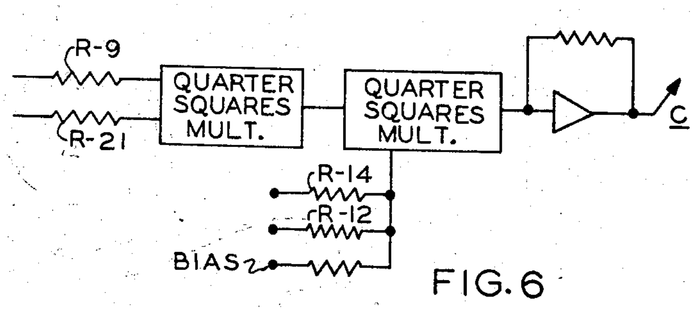
FIG. 6 is a schematic diagram of a modified section of the device illustrated in FIG. 4.

The relay amplifiers, 102 through 110, may be biased each at selected levels to operate their associated relays only when the amplifier A–5 output signal applied to them exceeds a respective predetermined amount. Additional contacts (not shown) may be provided on each of the output relays, to serve as temporary holding contacts, to advance a conventional paper feed mechanism to position the next character in front of the scanning mask, and to provide output signals to further data processing machinery. The setting of thresholds for the relays may be eased and the proper threshold values spread out over a greater range by *multiplying* the inputs to A–5 instead of adding them in A–5, by substituting a pair of conventional four-quadrant analog "quarter squares" electronic multipliers, as shown in FIG. 6.

Figure 5:
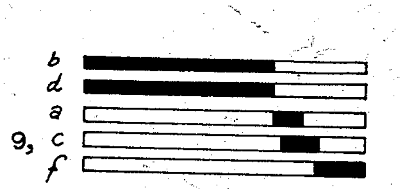
FIG. 5 is a timing diagram of a portion of the device illustrated in FIG. 4.

An extremely simple timing schedule for the sampling switch (which ordinarily would be electronic rather than electromechanical in any commercial application of the invention) is shown in FIG. 5. Arms *b* and *d* are closed all of the time a given aperture on mask 11 sweeps across the unknown character, and then they open when the mask is past the character. Arm *a* closes for a brief period only after the unknown character has been scanned and simultaneously arm *g* turns on emitter follower transistor T–1 to apply the voltage stored in integrator I–2 to be compared by amplifier A–6 with the voltage applied from arm *a*. Arm *f* closes for a brief period thereafter, to gate on transistors T–2 and T–3 which discharge integrators I and I–2, and to reset flip-flop F/F.

Inasmuch as the signals fed to the three channels all depend upon the absolute amount of light falling on the photosensor, it will be beneficial to periodically recalibrate the photosensor-amplifier A–1 circuit to provide a known amount of volts for a given amount of applied light. This may be done at the beginning or end of each line of type, by having the machine scan a blank space and then by controlling the gain of amplifier A–1 in accordance with the peak signal derived during the scanning of the blank space. By scanning a blank space on the paper being read, the effect of reflectivity of the paper is compensated for as well as the photosensor gain. In order that the machine not mistake an area bearing a very small character (such as a period or a comma) for a blank space during the recalibration operation, the edge of the document may be sensed mechanically and the document transported so as to ensure that a blank margin area on the document is positioned beneath the scanning mask. Various photosensors may be calibrated by controlling their dynode or other operating voltages instead of amplifier A–1 gain, in a manner which will be readily apparent to those skilled in the art.

In the illustrative system of FIG. 4 the proportional and derivative channel signals applied to amplifier A–5 are "similarity" signals, in that each *increases* positively upon the scanning of a matching character, and the sum of the integral channel output and the bias applied to A–5 increases with greater similarity. It is within the scope of the invention to operate instead with "difference" signals, which are *lower* for matching characters. For example, if the present "inhibit" inputs to AND gate 20 are "OR"ed together and connected to provide an enabling signal to gate 20, integrator I output will tend to be *higher* for *unmatching* characters. By changing the bias fed to the Schmitt trigger and the initial stable state of flip-flop F/F the voltage applied through R–21 may be made to *increase* whenever a low enough value of unmasked light has not been sensed during the scanning of a character, so that R–21 will tend to provide a high output pulse for all characters except the matching character, and by removing the bias which is summed with the integral channel output, all channels will provide "difference" signals, and the output relays will be operated on a rejection basis, to reject all characters except the matching one. If "difference" signals are used, they also may be multiplied instead of added, if desired, to spread out the relay thresholds.

Figure 3:
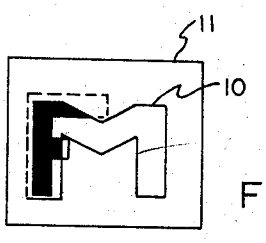
FIG. 3 illustrates the pattern mask shown in FIG. 1 in registration with a further character to be recognized.

It should now be understood that an important feature of the present invention is the use of a mask having a plurality of apertures therein corresponding to the selected characters to be recognized, or, alternatively, a plurality of individual masks each of which contain an aperture corresponding to one of the characters to be recognized, each aperture having dimensions greater than the corresponding dimensions of the associated character. Thereafter, the amount of light directed through the mask and reflected by the character is converted into an electrical signal which is then mathematically operated upon in several parallel channels and combined to identify the character. It should also be noted that, and this is another important feature of the invention, a matching character, such as the character M and mask 11 illustrated in FIG. 1 provides a time interval of essentially constant light intensity while a non-matching character, such as F in FIG. 3, in general does not. This time interval of essentially constant light intensity is efficiently employed in the character recognition devices of the present invention as hereinbefore described in detail.

Although the embodiment of the invention as specifically described until now has been primarily concerned with a device wherein the original and "functions of the original" signals were each compared with stored data to provide further signals which are combined to determine the final best match, it is also contemplated that the original and functions of the original signals may alternatively be combined in a preselected manner prior to being compared with the stored data. In this manner complex waveforms may be generated and compared with the stored data to increase the size of vocabulary of the character to be recognized. Finally, it is additionally contemplated that various combinations of the above described embodiments may be employed as desired.

It will thus be seen that the objects set forth above, among those made apparent from the preceding description, are efficiently attained, and since certain changes may be made in the above construction without departing from the scope of the invention, it is intended that all matter contained or shown in the accompanying drawings shall be interpreted as illustrative and not in a limiting sense.

Having described my invention, what I claim as new and desire to secure by Letters Patent is:

1. Character recognition apparatus comprising: means for scanning any character of a font of characters with a light spot and in association with the scanning of said character, to scan a plurality of models of different characters of said font to generate from the association of each model to said character a plurality of non-match signals and a unique match signal for the association of said character with the matching one of said models, said unique signal having a plurality of measurable characteristics to distinguish it from each of the unique signals which result from a match of any other characters of said font with its model and from all non-match signals, said characteristics being relatively invariant with small amounts of misregistration of said character with said light spot, the departure of said signal from a reference value being one of said characteristics, the relative invariance of said signal being another of said characteristics, means for sensing said departure and for providing a first descriptor responsive to the amount of said departure, means for measuring the degree of invariance of said departure to produce a second descriptor, means for measuring a second relatively invariant characteristic of said unique signal to produce a third descriptor, means for combining two of said descriptors to provide a further descriptor; and character identifying output means responsive to said third descriptor for identifying said character.

2. Character recognition apparatus, comprising, in combination: means for scanning a character and for providing a first electrical signal during the scanning of said character; means for sensing said first electrical signal and for providing a second electrical signal only if said first electrical signal exceeds a predetermined peak during the scanning of said character; means for time integrating said first electrical signal during the scanning of said character and for providing a third electrical signal having a level indicative of the relationship between the integral of said first electrical signal and a predetermined quantity; means for quantitatively combining said second and third electrical signals to provide a further electrical signal; and character-identifying output means responsive to said further electrical signal for identifying said character.

3. Apparatus according to claim 2 in which said means for combining said second and third électrical signals comprises adding means connected to receive said second and third electrical signals and operative to provide said further eletcrical signal.

4. Apparatus according to claim 2, in which said means for combining said second and third electrical signals comprises an electronic function generator means operable to provide said further electrical signal which varies in accordance with a multiplicative function of both said second and said third electrical signals.

5. Character recognition apparatus, comprising, in combination: means for scanning a character and for providing a first electrical signal during the scanning of said character; means for sensing said first electrical signal and for providing a second electrical signal if said first electrical signal exceeds a predetermined threshold during the scanning of said character; means for differentiating said first electrical signal during the scanning of said character and for providing a third electrical signal having a level indicative of the relationship between the derivative value of said first electrical signal and a second predetermined threshold; means for combining said second and third electrical signals to provide a further electrical signal and character-identifying output means responsive to said further electrical signal for identifying said character.

6. Character recognition apparatus, comprising, in combination means for scanning a character and for providing a first electrical signal during the scanning of said character; means for integrating said first electrical signal during the scanning of said character and for providing a second electrical signal having a level indicative of the relationship between the integral value of said first electrical signal and a first predetermined threshhold; means for differentiating said first electrical signal during the scanning of said character and for providing a third electrical signal having a level indicative of the relationship between the derivative value of said first electrical signal and a second predetermined threshold; means for combining said second and third electrical signals to provide a further electrical signal; and character-identifying output means responsive to said further electrical signal for identifying said character.

7. Character recognition apparatus, comprising, in combination: means for comparing an unknown character with each of a plurality of stored preference characters and for deriving a separate signal from each comparison; first means for comparing each of said separate signals with a respective stored quantity associated with a respective one of said reference characters and for providing a plurality of first electrical signals associated each with a respective one of said reference characters; means including time integrator means for integrating said spearate signals and for providing a plurality of second electrical signals; second means for comparing each of said second electrical signals with a respective further stored quantity associated with a respective one of said reference characters and for providing a plurality of third electrical signals associatetd each with a respective one of said reference characters; means for quantitatively combining said first and third electrical signals to provide a further electrical signal; and character-identifying output means responsive to said further electrical signal for identifying said unknown character.

8. Apparatus according to claim 7 in which said first and secoind means for comparing are arranged to provide first and third electrical signals having magnitudes which increase in accordance with increasing similarity between said unknown character and each stored reference character; and in which said character-identifying means includes means for selecting the largest of said further electrical signals to identify said unknown character.

9. Apparatus according to claim 7 in which said first and second means for comparing are arranged to provide first and third electrical signals having magnitudes which increase in accordance with increasing difference between said unknown character and each stored character; and in which said character-identifying means includes means for selecting the smallest of said further electrical signals to identify said unknown character.

10. Character recognition apparatus, comprising, in combination: means for comparing an unknown character with each of a plurality of stored reference characters and for deriving a separate signal from each comparison; first means for comparing each of said separate signals with a respective stored quantity associated with a respective one of said reference characters and for providing a plurality of first electrical signals associated with a respective one of said reference characters; means including differentiating means for differentiating said separate signals and for providing a plurality of second electrical signals; second means for comparing each of said electrical signals with a respective further stored quantity associated with a respective one of said reference characters and for providing a plurality of third electrical signals associated with a respective one of said reference characters; means for combining said first and third electrical signals to provide a further electrical signal; and character-identifying output means responsive to said further electrical signal for identifying said unknown character.

11. Character recognition apparatus, comprising, in combination: means for superimposing and relatively translating an area bearing an unknown character on a document with respect to each of a plurality of optical masks having apertures representative of known characters but exceeding in aperture size by predetermined amounts the boundaries of the actual known characters which they respectively represent; means for sensing light reflected from said area bearing said unknown character during translation of said unknown character past each of said optical masks and for providing a respective electrical signal associated with each of said masks; means for differentiating each of said electrical signals to provide respective second electrical signals; means for comparing said second electrical signals with respective stored signals representative of respective characters and providing further electrical signals which vary in accordance with predetermined functions of said comparison; and character-identifying means responsive to said further electrical signals to identify said unknown character.

12. Character recognition apparatus, comprising, in combination: means for superimposing and relatively translating an area bearing an unknown character on a document with respect to each of plurality of optical masks having apertures representative of known characters but exceeding in aperture size by predetermined amounts the boundaries of the actual known characters which they respectively represent; means for sensing light reflected from said area bearing said unknown character during translation of said unknown character past each of said optical masks and for providing a respective electrical signal, generated by association of said character with each of said masks; means for integrating each of said electrical signals to provide respective second electrical signals; means for comparing said second electrical signals with respective stored signals representative of respective characters and providing further electrical signals which vary in accordance with predetermined functions of said comparison; and character-identifying means responsive to said further electrical signals to identify said unknown character.

13. Apparatus according to claim 12 having a further mask having a reference aperture, means for sensing light passing through said reference aperture, and means responsive to said light-sensing means for automatically calibrating said means for sensing light.

14. A character recognition device for characters having a predetermined physical outline comprising, a source of characters to be identified; a plurality of pattern defining masks, each of said masks including an aperture therein which corresponds to the physical outline of a predetermined one of said characters to be identified, each of the dimensions of said apertures being greater than said corresponding physical outline; means for providing relative motion individually between all of said plurality of masks and each of said characters to be identified; means for generating sequentially a plurality of first signals indicative of the association and degree of correspondence of all of said plurality of masks with each of said characters to be identified; means for simultaneously deriving from each of said first signals a plurality of other signals each representative of selected functions of said first signal, and logic circuit means for combining selected ones of said plurality of other signals to identify each of said characters provided by said source upon said correspondence of one of said masks within a predetermined tolerance of the physical outline of said character.

15. A character recognition device comprising, means for sequentially scanning a plurality of indicia through each of a plurality of pattern masks to successively derive a plurality of first electrical signals, each of said masks including an enlarged representation of a selected one of said plurality of indicia; means for logically generating from each of said first signals, second, third, and fourth signals mathematically related to said first signal; adjustable circuit means for modifying the magnitude of each of said second, third, and fourth signals, said adjustable means being responsive to further means synchronized with the relative positions of said plurality of masks; combining means for summing the magnitudes of at least two of said modified second, third, and fourth signals; and means for identifying each of said indicia when said first, second, and third signals exhibit a magnitude within a predetermined tolerance of the magnitude modification provided by said adjustable circuit means.

References Cited

UNITED STATES PATENTS

| | | | |
|---|---|---|---|
| 3,246,297 | 6/1966 | Silverstein | 340—149 |
| 2,646,465 | 7/1953 | Davis et al. | 340—146.3 |
| 2,927,303 | 3/1960 | Elbinger | 340—146.3 |

FOREIGN PATENTS

| | | |
|---|---|---|
| 910,808 | 11/1962 | Great Britain. |

MAYNARD R. WILBUR, *Primary Examiner.*

J. I. SCHNEIDER, *Assistant Examiner.*